March 22, 1932. T. H. THOMAS ET AL 1,850,573
COUPLING VALVE DEVICE
Filed Sept. 17, 1928
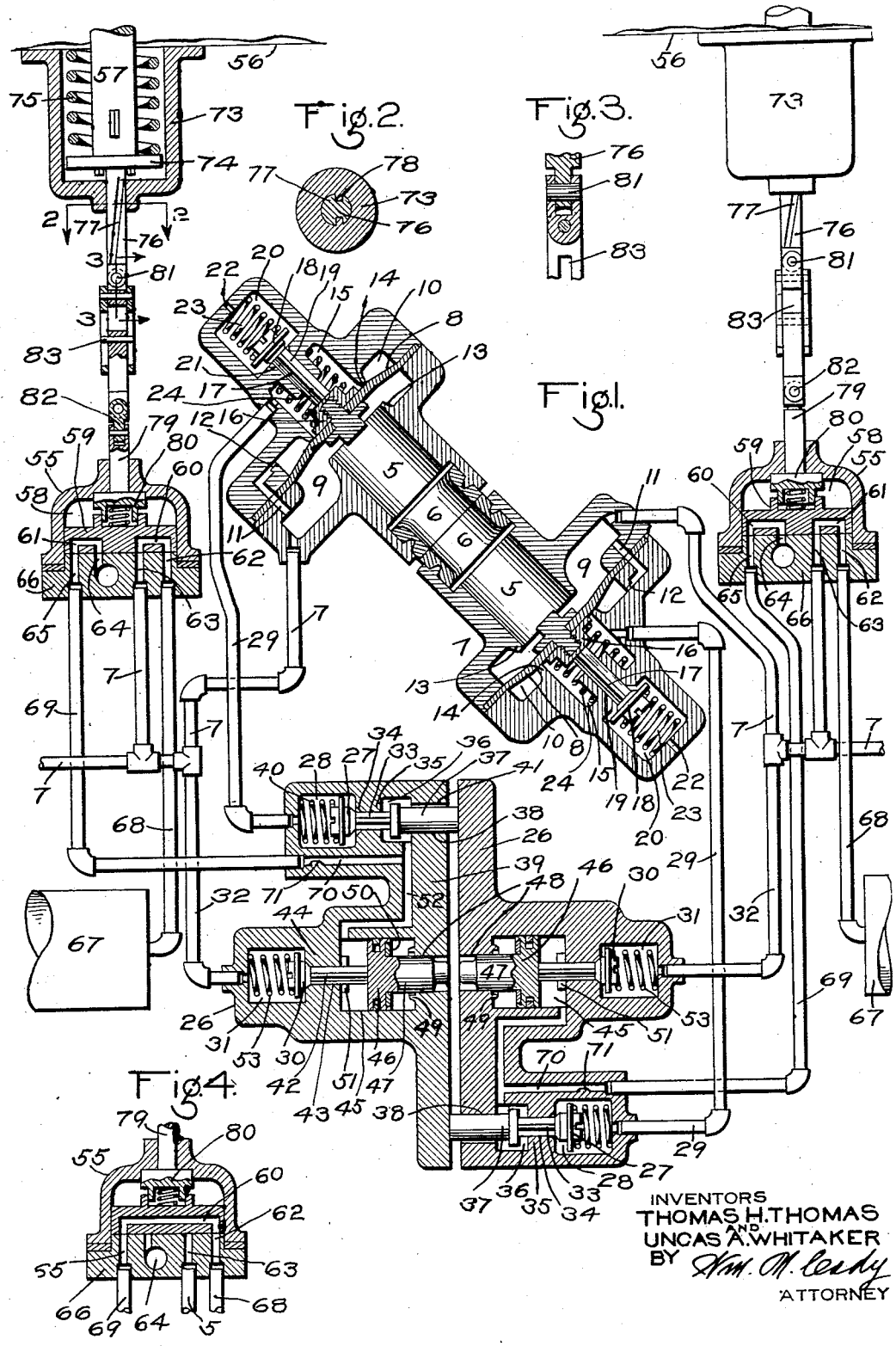
INVENTORS
THOMAS H. THOMAS
AND
UNCAS A. WHITAKER
BY
ATTORNEY Patented Mar. 22, 1932

1,850,573

UNITED STATES PATENT OFFICE

THOMAS H. THOMAS, OF EDGEWOOD, AND UNCAS A. WHITAKER, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA

COUPLING VALVE DEVICE

Application filed September 17, 1928. Serial No. 306,509.

This invention relates to automatic train pipe couplings, and more particularly to the type known as the tight or rigid lock coupling.

An object of the invention is to provide a train pipe coupling of the above mentioned type wherein the train pipe passage will be automatically closed when the coupling is uncoupled from a counterpart coupling.

Another object of the invention is to provide means actuated by the coupling pin of a car for operating a valve controlling the flow of fluid through a train pipe carried by the car.

Another object of the invention is to provide a train pipe coupling of the above mentioned type wherein the train pipe passages of two counterpart couplings will be automatically closed when the coupling pin of one car is actuated.

Another object of the invention is to provide a valve device for train pipe couplings which is automatically actuated when the coupling is uncoupled from a counterpart coupling.

Another object of the invention is to provide a train pipe coupling of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings: Figure 1 is a diagrammatic sectional view of two counterpart train pipe couplings embodying the invention, showing the same coupled; Fig. 2 is a horizontal section taken on the line 2—2 of Fig. 1; Fig. 3 is a vertical section taken on the line 3—3 of Fig. 1; and Fig. 4 is a sectional view of one of the rotary valve devices shown in Fig. 1, showing the valve thereof positioned to effect the closing of the brake pipe diaphragms when the couplings are being uncoupled.

Train pipe couplings of the type known as the tight or rigid lock coupling, are shown for example, in the Westinghouse Patent No. 708,747, dated September 9, 1902, and in which each coupling head is provided with one or more train pipe passages the ends of which are provided with gaskets adapted to engage the corresponding gaskets of a counterpart coupling when the coupling heads are interlocked and make a fluid tight joint between each train pipe section.

While a coupling of the above type will automatically couple with a counterpart coupling when two cars are brought together, it is necessary to apply dummy couplings to the ends of the train pipe passages when the cars are uncoupled to retain the fluid in the train pipes of the uncoupled sections.

By the present invention, means are provided for automatically closing the open end of the train pipe passage of an automatic train pipe coupling when the coupling is being uncoupled from a counterpart coupling.

Referring to the drawings, the coupling head has a train pipe passage 5, the forward end of which is provided with a gasket 6 adapted to engage the corresponding gasket on the counterpart coupling and make a fluid tight joint when the couplings are connected together in the manner illustrated in the above mentioned patent.

Mounted in the coupling is a valve device adapted to be automatically actuated when the cars are being uncoupled to shut off the supply of fluid under pressure in the brake pipe 7 from the passage 5 so as to prevent the loss of air.

The valve device includes a diaphragm 8 dividing the casing into two chambers 9 and 10. The chamber 9, which is formed as an enlargement of the passage 5, is in communication with the chamber 10 through a passage 11 having a restricted portion 12 therein to provide a choke. The brake pipe 7 enters chamber 9.

The end portion of the passage 5 facing the diaphragm 8 is formed with a seat rib 13, with which the diaphragm is adapted to engage when the coupling is uncoupled.

As shown in Fig. 1, when the coupling is operatively connected to a counterpart coupling, the diaphragm 8 will be unseated from the seat rib 13, and will be seated against a seat rib 14 so as to close the chamber 10 from a chamber 15 of less area. The portion of the diaphragm disposed within the seat rib 14 carries a head 16.

The fluted stem 17 of a valve 18 extends through an opening 19 in a wall separating the chamber 15 from a chamber 20 and bears against the head 16. A seat 21 is formed in the wall for the valve 18. The chamber 20 is open to atmosphere through a vent 22.

Mounted in chamber 20 is an expansible coil spring 23 which bears against the head of valve 18 and maintains the stem 17 in contact with the head 16.

Mounted in chamber 15 and encircling the valve stem 17 is an expansible coil spring 24 which bears against the head 16 and tends to force the diaphragm 8 away from the seat rib 14 against the pressure of fluid in chamber 9. However, inasmuch as chamber 15 will be open to the atmosphere through opening 19, chamber 20 and vent 22 when the couplings are connected, the portion of the diaphragm 8 outside of the seat rib 14 will be balanced, due to the free communication through passage 11 to both sides thereof, but since the area of the diaphragm inside the seat rib 14 is exposed to atmospheric pressure, the fluid under pressure in chamber 9 will maintain the diaphragm against seat rib 14.

For the purpose of controlling the operation of the valve device, a controlling device 26 is provided, which device may be carried by the coupling or may be made a part thereof.

The controlling device 26 includes a valve 27 contained in a chamber 28, which chamber is connected to the chamber 15 by a pipe 29, and a valve 30 contained in a chamber 31 connected to the brake pipe 7 by a pipe 32.

The valve 27 has a fluted stem 33 which extends through an opening 34 formed in a wall 35 separating the chamber 28 from a chamber 36 and engages the head of a plunger 37.

The plunger 37 has a shank portion projecting through an opening 38 formed in the outer wall 39 of the device 26. The extremity of the plunger 37 abuts the face of the adjacent corresponding wall 39 of the counterpart coupling controlling device when the couplings are interlocked and maintains the valve 27 away from its seat whereby the chamber 28 will be in communication with the chamber 36 in the manner shown in Fig. 1.

An expansible coil spring 40 is mounted in the chamber 28 and bears against the head of valve 27. This spring is adapted to seat the valve 27 when the couplings are being uncoupled in a manner to be hereinafter described.

The chamber 36 is vented to atmosphere through a leakage groove 41 formed longitudinally of the opening 38.

The valve 30 has a fluted stem 42 which extends through an opening 43 formed in a wall 44 separating the chamber 31 from a chamber 45 and engages the head of a piston 46.

The piston 46 has a stem 47 mounted in an opening 48 formed in the wall 39 heretofore referred to. A seat rib 49 is provided around the inner end of the opening 48 against which a valve 50 of the piston 46 abuts during the operation of the device in the manner to be hereinafter described.

The side of the wall 44 adjacent to the chamber 45 carries projections 51 for limiting the inward movement of the piston 46, so that the head thereof will not close a passage 52 connecting chamber 45 with chamber 36.

The stem 47 of the piston 46 of the controlling device 26 of one coupling is in juxtaposition with the stem 47 of the piston 46 of the controlling device 26 of the counterpart coupling when two couplings are coupled.

An expansible coil spring 53 is mounted in the chamber 31 and bears against the head of valve 30. This spring is adapted to return the valve 30 to its seat to close the opening 43 during the operation of the device in the manner to be hereinafter described.

When the coupling is connected to a counterpart coupling the fluid pressure in chamber 31 will correspond to the fluid pressure in brake pipe 7, inasmuch as this chamber is at all times in communication with the brake pipe 7 through pipe 32, and therefore the pressure of fluid in chamber 31 will maintain valve 30 seated. Furthermore, piston 46 will be so disposed in chamber 45 that its stem 47 does not project beyond the outer face of the wall 39.

Associated with the controlling device 26 is a rotary valve device 55 disposed below the usual car coupler 56 and adapted to be operated by the coupling pin 57 when the same is actuated to uncouple the cars.

The rotary valve device 55 has a chamber 58 containing a rotary valve 59. The valve 59 is provided with cavities 60 and 61 which are adapted to register with ports 62 and 63, and 64 and 65 respectively, in the seat 66 of the valve.

The port 62 is connected to a reservoir 67 by a pipe 68, while the port 63 is connected to the brake pipe 7. The cavity 60 is adapted to connect the ports 62 and 63 when the couplings are coupled so that the reservoir 67 will be charged from the brake pipe.

The port 64 vents to the atmosphere, while port 65 connects the rotary valve device 55 to the controlling device 26 by a pipe 69 leading to a passage 70 having a restricted portion 71 to provide a choke, and intersecting passage 52 heretofore referred to.

The coupling pin 57 terminates in a casing 73 depending from the car coupler 56. The end of the coupling pin 57 has a flange 74 fixed thereto, against which bears one end of an expansible coil spring 75 which encircles the coupling pin 57 and is adapted to force the same downwardly.

A shaft 76, depending from the flange 74, is slidably and rotatably mounted in the casing 73. Spiral grooves 77 are formed in the shaft 76 and receive tongues 78 formed on the casing 73, so that when the shaft 76 is raised with the coupling pin 57, in the manner to be hereinafter described, it will be turned.

A shaft 79 is connected to the rotary valve 59 by means of a slip joint 80.

The grooved shaft 76 is arranged in vertical alinement with the shaft 79, being connected thereto by means of universal joints 81 and 82. Interposed between the universal joints is a telescoping section 83 which permits raising and lowering movement of the car coupling and the train pipe coupling relative to one another and also vertical movement of the coupling pin 57 and shaft 76 relative to the shaft 79. The universal joints 81 and 82 allow for angular movement between the car and train pipe coupling.

In operation, when it is desired to uncouple the cars equipped with the device, the coupling pin 57 of one of the coupled cars is raised through the usual mechanism (not shown), which will lift shaft 76. The shaft 76, during its raising movement, will be rotated through the medium of the spiral grooves 77 and tongues 78. The turning of the shaft 76 is transmitted through the universal joints 81 and 82 and telescopic connection 83 to the shaft 79 of the rotary valve 59, which in turn will move, thereby bringing cavity 60 into position whereby ports 62 and 65 will be connected and ports 63 and 64 will be lapped (see Fig. 4).

Inasmuch as the pressure of the fluid in reservoir 67 will be substantially equal to the pressure of the fluid in the brake pipe 7 when the couplings are connected, when the cars are being uncoupled and passage 63 has been closed in the manner just described, fluid from the reservoir 67, flowing through the rotary valve device 55, will pass through passage 65 and pipe 69 into passage 70 of the controlling device 26, it being understood that choke 71 in passage 70 limits the rate at which the fluid from the reservoir 67 flows through passage 70. From passage 70, the fluid under pressure from reservoir 67, will enter passage 52 and be directed thereby into chambers 36 and 45.

Inasmuch as the valve 27 will be unseated, the fluid in chamber 36 will flow through opening 27 into chamber 28 and thence through pipe 29 to chamber 15.

On the other hand the fluid entering chamber 45 will be prevented from escaping, inasmuch as valve 30 is seated, and hence the pressure will be built up in chamber 45 and force the valve piston 46 towards the seat rib 49, thereby moving the stem 47 outwardly through the opening 48 and into contact with the end of the corresponding stem 47 of the counterpart coupling. The outward travel of the valve piston 46 will be such that its stem 47 will force the valve piston 46 of the counterpart coupling inwardly toward the projections 51, thereby unseating valve 30 of the counterpart coupling.

When this valve 30 is unseated the fluid in brake pipe 7 will flow through pipe 32 into chamber 31, around the valve 30 and through opening 43 into chamber 45. From chamber 45, the brake pipe fluid will pass through passage 52 and enter chamber 36.

The fluid thus admitted to chamber 36 will flow through opening 34, past valve 27 and enter chamber 28, from which chamber it is conducted through pipe 29 to chamber 15. In this way, the chambers 15 of the two connected couplings will be supplied with fluid under pressure, one from reservoir 67 and the other from the brake pipe 7.

While each chamber 15 will be vented to the atmosphere through the opening 19, unseated valve 18 and port 22, it should be noted that the size of port 22 is considerably smaller than the size of pipe 29, so that the pressure of fluid flowing into chamber 15 will gradually be built up an amount sufficient to overbalance the pressure of the fluid in chamber 9, and hence the diaphragm 8 will be moved away from the seat rib 14 and will be seated against the seat rib 13, this action of the diaphragm 8 being accelerated by the force of the expansible coil spring 24.

The actuation of the diaphragms 8 of the two connected counterpart couplings whereby such diaphragms 8 are unseated from the seat ribs 14 and seated against the seat ribs 13 is effected when the gaskets 6 of the adjoining passages 5 are pulled apart, thereby sealing the open ends of the two chambers 9 to prevent the escape of the fluid in the brake pipe 7.

When the diaphragm 8 of each coupling is seated against the seat rib 13 in the manner just described, the head 16 of the diaphragm will move away from the outer end of the valve stem 17, and therefore the spring 23 will force the valve 18 towards its seat 21, thereby closing the atmospheric vent of chamber 15.

On the other hand, the fluid from brake pipe 7 entering the portion of chamber 9 surrounding the seat rib 13 will flow through passage 11 into chamber 10, thereby building up and maintaining a pressure in chamber 10, and as the area of this chamber is greater than the area of the chamber 9 surrounding seat rib 13, the diaphragm 8 will be retained against the seat rib 13 as long as the couplings remain uncoupled.

When the couplings commence to separate the juxtaposed faces of the walls 39 of the controlling devices 26 will be pulled away from each other, thereby permitting the plungers 37 to be moved outwardly of the openings 38 under force exerted by the springs 40. As these springs bear against the heads of valves 27, the valves will be seated thereby closing the passages 34. The fluid remaining in the reservoir 67 will then flow from chamber 36 through groove 41 to the atmosphere.

Upon release, the coupling pin 57 will be returned by spring 75 to the normal position shown in the drawings, and this movement will return the rotary valve device 55 to the position illustrated in Fig. 1, positioning the part of the said device for coupling, as will be readily understood.

As hereinbefore explained, when the cars are uncoupled the plunger 37 of the control device 26 of each coupling will project a considerable distance beyond the face of the wall 39, and the valve 27 will be seated. Therefore, when the cars are brought together for coupling up, the face of the wall 39 will engage the plunger of the counterpart coupling and force the same inwardly. This action will unseat the valve 27 and hence the fluid in chamber 15 will be vented to the atmosphere through pipe 29, chamber 28, opening 34, chamber 36 and groove 41.

When the pressure of the fluid in chambers 15 and 10 is reduced by the escape of the fluid through the vent 41, the fluid in chamber 9 will force the diaphragm away from the seat rib 13 and will seat the same against the seat rib 14. This action can be timed to take place immediately after the gaskets 6 have been brought together so that brake pipe pressure can be quickly established in the connected train pipe sections.

In devices of the type herein shown and described it is of advantage to permit a predetermined reduction in brake pipe pressure when the couplings are unintentionally parted before closing the open ends of the brake pipe passages so that an emergency application of the brakes can be effected.

Therefore, assuming that the couplings are coupled together and the parts thereof are in the positions shown in Fig. 1, when the couplings are unintentionally parted and the gaskets 6 separate from each other, the juxtaposed controlling devices 26 will also be separated.

When the adjoining faces of the walls 39 recede from each other, the plunger 37 of each of the controlling devices 26 will be forced outwardly by spring 40 and valve 27, this action seating the valve 27 and thereby closing the atmospheric vent from chamber 15 through pipe 29, chamber 28, opening 34, chamber 36, and groove 41. However, inasmuch as chamber 15 is also vented to the atmosphere through opening 19, chamber 20 and vent 22, should any fluid in chamber 10 leak past the seat rib 14, such fluid can pass to the atmosphere through vent 22, as has been described.

In this manner a quantity of fluid will be permitted to flow from the brake pipe 7, through the chamber 9 and out the passage 5 of the separated couplings to produce an emergency application of the brakes. As this action will reduce the pressure of the fluid in chamber 9, the diaphragm 8 will be forced from the seat rib 14 by spring 24 and will be seated against seat rib 13, thereby closing the passage 5 so as to retain the fluid in the brake pipe after the emergency application of the brakes has been effected.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. The combination with a coupling having a brake pipe passage provided with a chamber, a diaphragm mounted in the coupling and forming one wall of the chamber, a seat rib formed in the wall of the chamber opposite to the diaphragm, said seat rib being disposed around the brake pipe opening, a second chamber on the opposite side of the diaphragm, an opening in the wall of the second chamber, a seat rib formed in the wall around the opening, a fluid reservoir connected to the brake pipe, means connecting the reservoir with the last named opening, and means for causing the diaphragm to seat against the second named seat rib when the coupling is coupled to a counterpart coupling whereby the brake pipe passage will be open.

2. The combination with a coupling having a brake pipe passage provided with a chamber, a diaphragm mounted in the coupling and forming one wall of the chamber, a seat rib formed in the wall of the chamber opposite to the diaphragm, said seat rib being disposed around the brake pipe opening, a second chamber on the opposite side of the diaphragm, an opening in the wall of the second chamber, a seat rib formed in the wall around the opening, a fluid reservoir connected to the brake pipe, means connecting the reservoir with the last named opening, means for causing the diaphragm to seat against the second named seat rib when the coupling is coupled to a counterpart coupling whereby the brake pipe passage will be open, and means actuated when the coupling is being uncoupled for disconnecting the reservoir from the brake pipe and then directing the fluid in the reservoir toward the second chamber to cause the diaphragm to unseat from the second named seat rib and seat against the first named seat rib.

3. The combination with a coupling having a train pipe provided with a valve adapted to close the open end of the pipe when the coupling is uncoupled and adapted to be unseated from the train pipe when the coupling is coupled to a counterpart coupling, of means for controlling the actuation of the valve comprising a pressure operated device adapted to be juxtaposed with respect to the corresponding device of a counterpart coupling when two couplings are connected together, a fluid reservoir connected to the train pipe, a rotary valve for disconnecting the reservoir from the train pipe and for connecting the same to the pressure operated device, and flexible means for operating the rotary valve simultaneously with the uncoupling operation.

4. The combination with a train pipe coupling having a train pipe passage adapted to be connected to the corresponding passage of a counterpart coupling when the two couplings are coupled together, of a valve for closing the train pipe passage when the coupling is uncoupled, means for retaining the valve in an inoperative position when the coupling is connected to a counterpart coupling, means for operating the valve to close the train pipe passage when the couplings are uncoupled, and means for retarding the operation of the valve when the couplings are unintentionally uncoupled to permit a predetermined reduction of pressure in the train pipe.

5. The combination with a coupling having a brake pipe passage provided with a chamber and having a seat formed in the passage adjacent to the chamber, of a diaphragm mounted in the chamber and normally retained out of engagement with the seat when the coupling is connected to a counterpart coupling, means for causing said diaphragm to engage the seat to close the passage when the coupling is uncoupled, and means for retarding the operation of the diaphragm when the coupling is unintentionally uncoupled until a predetermined reduction in the pressure of the fluid in the brake pipe has been effected.

In testimony whereof we have hereunto set our hands, this 15th day of September, 1928.

THOMAS H. THOMAS.
UNCAS A. WHITAKER.